US009045679B2

(12) United States Patent
Buissette et al.

(10) Patent No.: US 9,045,679 B2
(45) Date of Patent: Jun. 2, 2015

(54) EUROPIUM, AND YTTRIUM OXIDE OR GADOLINIUM OXIDE CORE/SHELL COMPOSITION, PHOSPHOR INCLUDING SAID COMPOSITION, AND METHODS FOR PREPARING SAME

(75) Inventors: Valérie Buissette, Paris (FR); Thierry Le-Mercier, Rosny-sous-Bois (FR)

(73) Assignee: RHODIA OPERATIONS, Aubervilliers (FR)

( * ) Notice: Subject to any disclaimer, the term of this patent is extended or adjusted under 35 U.S.C. 154(b) by 699 days.

(21) Appl. No.: 13/262,099

(22) PCT Filed: Mar. 25, 2010

(86) PCT No.: PCT/EP2010/053896
§ 371 (c)(1),
(2), (4) Date: Sep. 29, 2011

(87) PCT Pub. No.: WO2010/112394
PCT Pub. Date: Oct. 7, 2010

(65) Prior Publication Data
US 2012/0032113 A1      Feb. 9, 2012

(30) Foreign Application Priority Data

Mar. 30, 2009   (FR) ..................... 09 01534

(51) Int. Cl.
| C09K 11/08 | (2006.01) |
| C09K 11/70 | (2006.01) |
| C09K 11/02 | (2006.01) |
| C09K 11/77 | (2006.01) |

(52) U.S. Cl.
CPC ............. *C09K 11/02* (2013.01); *C09K 11/7795* (2013.01); *C09K 11/7787* (2013.01)

(58) Field of Classification Search
CPC ............ C09K 11/7787; C09K 11/663; C09K 11/7705; C09K 11/7771; C09K 11/7724; C09K 11/7728; C09K 11/7738; C09K 11/7761; C09K 11/7768; C09K 11/7778; C09K 11/7783; C09K 11/7786; C09K 11/7796; C09K 11/7777; C09K 11/7795; C09C 2210/50; C01P 2004/64; C01P 2004/84; B01J 14/00; H01J 61/44
USPC ............. 252/301.4 R, 301.4 P; 428/403, 404, 428/690; 427/157, 212, 215; 977/773
See application file for complete search history.

(56) References Cited

U.S. PATENT DOCUMENTS

| 5,643,674 A * | 7/1997 | Bruno et al. ................. 428/403 |
| 2006/0222757 A1* | 10/2006 | Loureiro et al. ............... 427/64 |
| 2013/0082207 A1* | 4/2013 | Srivastava et al. ..... 252/301.4 R |

FOREIGN PATENT DOCUMENTS

JP    2003-212540 A    7/2003

OTHER PUBLICATIONS

Liu et al., "Synthesis of Y2O3:Eu3+ Hollow Spheres Using Silica as Templates", Aug. 2007, Journal of Rare Earths, vol. 25, No. 4, pp. 407-411.*
International Search Report (PCT/ISA/210) issued on Jun. 2, 2010, by European Patent Office as the International Searching Authority for International Application No. PCT/EP2010/053896.
Liu G. et al., "Synthesis of Y2 03: Eu<3+> Hollow spheres using Silica as Templates", Journal of Rare Earths, International Academic Publishers, Beijing, CN, vol. 25, No. 4, Aug. 1, 2007, 5 pages.
Liu G., et al., "Synthesis of SiO2/Y2O3: Eu core-shell materials and hollow spheres", Journal of Solid State Chemistry, Orlando, FL, US, vol. 178, No. 5, May 1, 2005, 5 pages.
M. Yu et al., "Silica spheres coated with YVO4:Eu layers via sol-gel process: a simple method to obtain spherical core-shell phosphors", Chem. Mater., vol. 17, 2005, 9 pages.
H. Wang et al., "Synthesis and luminescence properties of monodisperse spherical Y2O3: Eu@iO2 particles with core-shell structure" J. Ohys. Chem., vol. 111, 2007, 8 pages.
V. Bai et al., "Luminescent enhancement in europium-doped yttria nanotubes coated with yttria", Applied Physics Letters, vol. 88, 2006, 3 pages.
P. Yang et al., "Solvothermal synthesis and luminescent properties of monodisperse LaPO4:Ln (Ln=Eu, Ce, Tb) particles" Journal of Solid State Chemistry, vol. 182, Jan. 30, 2009, 10 pages.
M. Yu et al., "Sol-gel synthesis and photoluminescence properties of spherical SiO2@LaPO4: Ce/Tb particles with a core-shell structure" Nanotechnology, vol. 17, 2006, 8 pages.
H, Wang et al., "Monodisperse spherical core-shell-structured phosphors obtained by functionalization od silica spheres with Y2O3:Eu layers for field emission displays", Applied Physics Letters, vol. 87, 2005, 3 pages.

* cited by examiner

Primary Examiner — C Melissa Koslow
Assistant Examiner — Lynne Edmondson

(57) ABSTRACT

A composition including an inorganic core and a europium and yttrium oxide or gadolinium shell uniformly covering the inorganic core at a thickness greater than or equal to 300 nm is described. A phosphor including the composition is also described. In addition a process of forming the composition by: forming a suspension including the inorganic core with pH of 8 to 11; adding a solution including a europium salt and yttrium or gadolinium salt to the suspension and maintaining the pH of the reaction medium at a constant value; and separating the formed solid and calcining the same to a temperature of at most 1000° C. is described.

20 Claims, No Drawings

EUROPIUM, AND YTTRIUM OXIDE OR GADOLINIUM OXIDE CORE/SHELL COMPOSITION, PHOSPHOR INCLUDING SAID COMPOSITION, AND METHODS FOR PREPARING SAME

This application claims priority under 35 U.S.C. §119 of FR 0901534, filed Mar. 30, 2009, and is the United States national phase of PCT/EP2010/053896, filed Mar. 25, 2010, and designating the United States (published in the French language on Oct. 7, 2010, as WO 2010/112394 A1; the title and abstract were also published in English), each hereby expressly incorporated by reference in its entirety and each assigned to the assignee hereof.

The present invention relates to a core/shell composition based on europium and yttrium oxide or gadolinium oxide, to a phosphor comprising this composition and to methods of preparing them.

Europium-doped yttrium or gadolinium oxides are well known for their luminescence properties. They emit a red light when they are irradiated by UV. Phosphors based on these oxides that exploit this property are commonly used on an industrial scale, for example in trichromatic fluorescent lamps.

These phosphors contain rare earths, the price of which is high and is also subject to significant fluctuations. The reduction in the cost of such phosphors is therefore an important issue.

Moreover, the rarity of certain rare earths such as europium leads to a desire to reduce the amount thereof in the phosphors.

There is therefore an important need for phosphors with a reduced amount of expensive rare earths, given that, of course, this reduction in the amount must not be to the detriment of the luminescence properties of the phosphors, these properties having to be of the same order of those of current phosphors.

The subject of the invention is a phosphor that meets this requirement.

For this purpose, the invention relates to a composition which is characterized in that it comprises:
  a mineral core; and
  a shell based on europium oxide and on yttrium oxide or gadolinium oxide and homogeneously covering the mineral core over a thickness equal to or greater than 300 nm.

The invention also relates to a phosphor which is characterized in that it comprises a composition of the type described above.

Taking into account the specific presence of the mineral core, which occupies a large portion of the volume of the phosphor, the quantity of rare earth used is reduced compared with that of the currently known bulk phosphors, thereby reducing its cost.

However, despite this difference in internal structure, the phosphors of the invention have properties similar to those of the currently known phosphors.

In particular, it turns out that the presence of the non-phosphor core has no significant influence on the luminescence properties of the phosphors of the invention. In most cases, luminescence properties similar to those of the products of the prior art are obtained.

Other features, details and advantages of the invention will become even more fully apparent on reading the following description and the various specific, but nonlimiting, examples intended to illustrate it.

It should also be pointed out that, in the rest of the description, unless otherwise indicated, in all the ranges or limits of values given, the values at the bounds are included, the ranges or limits of values thus defined therefore covering any value at least equal to and greater than the lower bound and/or at most equal to or less than the upper bound.

The term "rare earth" is understood in the rest of the description to mean elements of the group formed by yttrium and those elements of the periodic table having an atomic number between 57 and 71 inclusive.

The term "specific surface area" is understood to mean the BET specific surface area determined by krypton adsorption. The surface areas given in the present description were measured on an ASAP2010 instrument after degassing the powder for 8 h at 200° C.

As mentioned above, the invention relates to two types of product: compositions, which may also be called in the rest of this description "precursors"; and phosphors obtained from these compositions or precursors. The phosphors themselves have luminescence properties sufficient for rendering them directly usable in the desired applications. The precursors do not have luminescence properties or they do possibly have luminescence properties but these are generally too low for use in these same applications.

These two types of product will now be described in more detail.

Compositions or Precursors

The compositions of the invention are essentially characterized by their specific core/shell structure which is described in detail below.

The mineral core is based on a material which may especially be an oxide or a phosphate.

Among the oxides, mention may in particular be made of zirconium oxide, zinc oxide, titanium oxide, magnesium oxide, aluminum oxide (alumina) and the oxides of one or more rare earths, one of them possibly acting as a dopant. As rare-earth oxide, gadolinium oxide, yttrium oxide and cerium oxide may be even more particularly mentioned.

The oxides preferably chosen may be yttrium oxide, gadolinium oxide and alumina. Alumina may be even more preferably chosen as it has especially the advantage of allowing calcination at a higher temperature when converting the precursor to the phosphor, without any diffusion of the dopant into the core being observed. This therefore makes it possible to obtain a product having optimum luminescence properties because of better crystallization of the shell as a result of the higher calcination temperature.

Among the phosphates, mention may be made of the orthophosphates of one or more rare earths, one of which may possibly act as a dopant, such as lanthanum orthophosphate ($LaPO_4$), lanthanum cerium orthophosphate ($(LaCe)PO_4$), yttrium orthophosphate ($YPO_4$) and rare-earth or aluminum polyphosphates.

According to one particular embodiment, the material of the core is a lanthanum orthophosphate, a gadolinium orthophosphate or an yttrium orthophosphate.

Mention may also be made of alkaline-earth phosphates, such as $Ca_2P_2O_7$, zirconium phosphate $ZrP_2O_7$ and alkaline-earth hydroxyapatites.

Other mineral compounds such as vanadates, especially a rare-earth vanadate ($YVO_4$), germanates, silicates, especially zinc or zirconium silicate, tungstates, molybdates, sulfates ($BaSO_4$), borates ($YBO_3$, $GdBO_3$), carbonates and titanates (such as $BaTiO_3$), zirconates, and alkaline-earth metal aluminates, optionally doped by a rare earth, such as barium and/or magnesium aluminates, such as $MgAl_2O_4$, $BaAl_2O_4$ or $BaMgAl_{10}O_{17}$, are furthermore suitable.

Finally, the compounds derived from the above compounds may be suitable, such as mixed oxides, especially rare-earth oxides, for example mixed zirconium cerium oxides, mixed phosphates, especially mixed rare-earth phosphates, and phosphovanadates.

In particular, the material of the core may have particular optical properties, especially UV reflection properties.

The expression "the mineral core is based on" is understood to denote an assembly comprising at least 50%, preferably at least 70%, more preferably at least 80% or even 90% by weight of the material in question. According to one particular embodiment, the core may essentially consist of said material (namely in a content of at least 95% by weight, for example at least 98% or even at least 99% by weight) or even entirely consist of this material.

Several advantageous embodiments of the invention will now be described below.

According to a first embodiment, the core is made of a dense material, corresponding in fact to a generally well crystallized material or else to a material having a low specific surface area.

The expression "low specific surface area" is understood to mean a specific surface area of at most 5 $m^2/g$, more particularly at most 2 $m^2/g$, even more particularly at most 1 $m^2/g$ and especially at most 0.6 $m^2/g$.

According to another embodiment, the core is based on a temperature-stable material. By this is meant a material which has a melting point at a high temperature, which does not degrade into a by-product which would be problematic for the application as a phosphor at this same temperature, and which remains crystalline, therefore not being transformed into an amorphous material, again at this same temperature. The high temperature intended here is a temperature at least above 900° C., preferably at least above 1000° C. and even more preferably at least 1200° C.

The third embodiment consists in using for the core a material that combines the features of the above two embodiments, therefore a temperature-stable material having a low specific surface area.

The fact of using a core according to at least one of the embodiments described above has a number of advantages. Firstly, the core/shell structure of the precursor is particularly well maintained in the phosphor that results therefrom, enabling a maximum cost advantage to be achieved.

Moreover, it has been found that the phosphors obtained from the precursors of the invention, in the manufacture of which a core according to at least one of the aforementioned embodiments was used, had photoluminescence yields not only identical but in certain cases superior to those of a phosphor of the same composition but not having a core/shell structure.

The materials of the core may be densified, especially by using the known molten salt technique. This technique consists in bringing the material to be densified to a high temperature, for example at least 900° C., optionally in a reducing atmosphere, for example an argon/hydrogen mixture, in the presence of a flux, which may be chosen from chlorides (for example sodium chloride or potassium chloride), fluorides (for example lithium fluoride), borates (lithium borate), carbonates and boric acid.

The core may have a mean diameter of especially between 1 and 10 μm.

These diameters may be determined by SEM (scanning electron microscopy) with statistical counting of at least 150 particles.

The dimensions of the core, and likewise the thickness of the shell that will be described below, may also be measured especially on transmission electron micrographs of sections of the compositions/precursors of the invention.

The other structural feature of the compositions/precursors of the invention is the shell.

This shell covers the core homogeneously over a thickness which is equal to or greater than 300 nm. The term "homogeneous" is understood to mean a continuous layer completely covering the core and having a thickness which is preferably never less than 300 nm. Such homogeneity is especially visible on scanning electron micrographs. X-ray diffraction (XRD) measurements furthermore demonstrate the presence of two separate compositions between the core and the shell.

The thickness of the layer may be more particularly at least 500 nm and even more particularly at least 700 nm. It may be equal to or less than 2000 nm (2 μm), more particularly equal to or less than 1500 nm and may be between 750 nm and 1500 nm.

The shell is based on or consists of the product having the desired luminescence properties (red phosphor) or capable of being able to give such properties, i.e. one based on or consisting of europium oxide and an yttrium oxide ($Y_2O_3$) or gadolinium oxide ($Gd_2O_3$), or else a mixed yttrium gadolinium oxide (($Y,Gd)_2O_3$), given that the invention is clearly applicable to the case of the mixed oxide even though the description, for the sake of simplification, refers hereafter only to an yttrium oxide or to a gadolinium oxide. The europium acts as dopant for the oxide $Ln_2O_3$ (where Ln denotes yttrium and/or gadolinium), that is to say it confer luminescence properties on this oxide.

The amount of europium is generally between 0.01% and 20% by weight of europium oxide relative to the weight of the oxide $Ln_2O_3$. Depending especially on the applications of the compositions, this amount may be between 4% and 15%, more particularly between 4% and 7%, especially in the case of applications in trichromatic lamps.

As is known per se, the europium doped oxide $Ln_2O_3$ may optionally contain other additional elements chosen from rare earths other than europium, gadolinium and yttrium. In particular, terbium, samarium and lanthanum may be mentioned.

These other elements may be present as dopants in addition to europium, which may in particular be the case for terbium or samarium. In such a case, the amount of this additional element is generally at most 1% by weight of oxide of the element relative to the weight of the oxide $Ln_2O_3$.

These other elements may also be present as substitutes for the gadolinium and/or the yttrium. This may for example be the case of lanthanum. In such a case, the amount of this additional element is generally at most 40%, more particularly at most 10%, by weight of oxide of the element relative to the weight of the oxide $Ln_2O_3$.

It is important to note here that the dopant or substituent functions attributed to the aforementioned elements were attributed purely as an indication, and are not limiting, and that the invention covers all cases in which the shell comprises an oxide $Ln_2O_3$ with one of these additional elements whatever its role or function in this oxide.

The particles comprising a core and a shell that constitute the compositions/precursors of the invention generally have a mean diameter of preferably between 1.6 μm and 15 μm. This diameter may more particularly be between 3 μm and 10 μm and even more particularly between 4 μm and 8 μm.

The mean diameter referred to is the volume average of the diameters of a population of particles.

The particle sizes given here, and for the rest of the description, are measured by the technique of laser particle size analysis using, for example, a Malvern laser particle size analyzer on a sample of particles dispersed in water subjected to ultrasound (130 W) for 1 minute 30 seconds.

Furthermore, the particles preferably have a low dispersion index, typically at most 0.7, more particularly at most 0.6 and even more particularly at most 0.5.

The term "dispersion index" for a population of particles is understood to mean, in the context of the present description, the ratio I as defined below:

$$I=(\emptyset_{84}-\emptyset_{16})/(2\times\emptyset_{50}),$$

where: $\emptyset_{84}$ is the diameter of the particles for which 84% of the particles have a diameter below $\emptyset_{84}$; $\emptyset_{16}$ is the diameter of the particles for which 16% of the particles have a diameter below $\emptyset_{16}$; and $\emptyset_{50}$ is the mean diameter of the particles, for which diameter 50% of the particles have a diameter below $\emptyset_{50}$.

Although the compositions/precursors according to the invention may possibly have luminescence properties after exposure at certain wavelengths, it is also possible, and even necessary, for these luminescence properties to be further improved by carrying out post-treatments on these products, so as to obtain true phosphors that can be used directly as such in the desired application.

It will be understood that the boundary between a precursor and an actual phosphor remains arbitrary and depends on just the luminescence threshold above which it is considered that a product can be used directly and acceptably by a user.

In the present case, and quite generally, compositions according to the invention that have not been subjected to heat treatments above about 1000° C. may be considered and identified as phosphor precursors since such products generally have luminescence properties that may be judged as not meeting the minimum brightness criterion for commercial phosphors that can be used directly as such, without any subsequent transformation. Conversely, products which, possibly after having been subjected to appropriate treatments, develop suitable brightnesses, sufficient for being used directly by an applicator, for example in lamps, can be qualified as phosphors.

The phosphors according to the invention are described below.

The Phosphors

The phosphors of the invention consist of, or comprise, the compositions of the invention as described above.

Consequently, everything described above regarding these compositions applies likewise here to the description of the phosphors according the invention. In particular, this applies to all the features given above regarding the structure formed by the mineral core and the homogeneous shell, the nature of the mineral core and that of the shell, and especially the composition of the oxide $Ln_2O_3$ and the particle size characteristics.

As will be seen later, the phosphors of the invention are obtained from compositions/precursors by a heat treatment that has the consequence of not substantially modifying the features of these compositions as mentioned above. However, this treatment improves the crystallization of the oxide $Ln_2O_3$ of the shell, thereby essentially improving the luminescence properties.

The methods of preparing the compositions and the phosphors of the invention are described below.

Methods of Preparation

The method of preparing a composition according to the invention is characterized in that it comprises the following steps:

(a) a suspension comprising the mineral core is formed, said suspension having a pH of between 8 and 11;

(b) a solution containing a europium salt and an yttrium or gadolinium salt, together with, where appropriate, a salt of a rare earth other than yttrium, europium or gadolinium, is added to said suspension, while maintaining the pH of the reaction mixture at a substantially constant value;

(c) the solid is separated from the mixture formed in the preceding step; and (d) the solid thus obtained is calcined at a temperature of at most 1000° C.

The first step is therefore a step in which a suspension is formed, this generally being an aqueous suspension comprising the mineral core as described above.

A core is chosen that has a particle size appropriate to that of the composition which it is desired to prepare. Thus, a core having a mean diameter between especially 1 and 10 μm and having a dispersion index of at most 0.7 or at most 0.6 may particularly be used.

The pH of the suspension must be between 8 and 11, more particularly between 8.5 and 9.5. It is brought to this value by adding a base to the suspension. As suitable base, the following may be mentioned as examples: metal hydroxides (NaOH, KOH, $Ca(OH)_2$, etc.) or else ammonium hydroxide.

The second step (b) of the method employs a solution containing a europium salt and, depending on the composition intended to be prepared, an yttrium and/or gadolinium salt. If it is intended to prepare a composition in which, as was seen above, the oxide $Ln_2O_3$ of the shell comprises additional rare earths, this solution then also contains a salt of this or these additional rare earths.

Among suitable salts, mention may be made by way of example of chlorides, nitrates, sulfates and acetates. Nitrates may more particularly be used.

The solution is added to the suspension formed in the preceding step (a).

This is preferably added progressively, for example over a period possibly ranging from 30 min to 10 h, more particularly from 30 min to 2 h, continuous and with stirring.

Moreover, according to another important feature of the method of the invention, which makes it possible in particular to obtain a homogeneous coating of the mineral core particles, this addition takes place while maintaining the pH of the reaction mixture at a substantially constant value, generally at the value of the pH of the suspension just before the addition of the salt solution. This pH value may thus be between 8 and 11, more particularly between 8.5 and 9.5.

The expression "pH maintained at a substantially constant value" is understood to mean the pH of the mixture will vary by at most 0.5 pH units about the setpoint value set, and more preferably by at most 0.1 pH units about this value.

To achieve these pH values and to maintain the pH required, a base as described above may be added to the reaction mixture.

In the second step (b), the addition of the solution to the suspension takes place at a temperature which may range from room temperature (20-25° C.) up to 60° C. or 80° C.

Contact between the suspension and the solution leads to the formation of a precipitate which comprises particles of a rare-earth (Y and/or Gd and Eu) and ammonium compound deposited as a homogeneous layer on the core. By varying the temperature and speed of addition conditions during the mixing of the solution with the suspension, it is possible to vary the dimensions of these particles. The thickness of the layer may vary according to the respective amounts of salts and core employed.

In a following step (c), the precipitate obtained is separated from the liquid phase of the reaction mixture by any solid/ liquid separation process such as, for example, filtration, centrifugation, settling or the like. It may also be washed one or more times so as, for example, to remove the soluble salts.

The precipitate may undergo a drying operation to evaporate the non-bonded water, for example by a heat treatment between 50° C. and 100° C., by drying under reduced pressure, or by spray drying.

It is possible, after step (b), for the reaction mixture to undergo a maturing step. The term "maturing step" is understood to mean that the mixture obtained after the end of the addition of the solution is maintained under the same temperature and stirring conditions as those of step (b). The duration of this maturing step may for example be between 15 min and 3 h, these values being given purely by way of indication and are not limiting.

It is also possible to carry out the maturing under pressure, for example in an autoclave, at a temperature which may be between 100° C. and 200° C., more particularly between 100° C. and 150° C.

The final step of the method is a calcination step. This step enables the rare-earth (Y and/or Gd and Eu)/ammonium compound of the layer to be converted into an oxide of these same rare earths.

This calcination generally takes place in air.

The calcination time may be determined conventionally, for example by checking for constant weight. Purely as indication, the calcination time may vary between about 30 min and 6 h.

After this treatment, a composition or precursor according to the invention is obtained.

The phosphors of the invention are obtained by calcination, at a temperature of at least 1200° C., of the compositions/precursors as described above or the compositions/precursors obtained by the method that was also described above. This temperature may be between about 1200° C. and 1650° C., more particularly between 1300° C. and 1500° C.

The precursors are converted to effective phosphors by this treatment.

Although, as indicated above, the precursors may themselves have intrinsic luminescence properties, these properties are generally insufficient for the intended applications and are greatly improved by the calcination treatment.

The calcination is generally carried out in air.

As is known, the calcination may be carried out in the presence of a flux or fluxing agent such as, for example, lithium fluoride, lithium tetraborate, lithium chloride, sodium chloride, barium chloride, lithium carbonate, sodium carbonate, barium carbonate, lithium phosphate, ammonium chloride, boron oxide, boric acid and ammonium phosphates, as well as mixtures thereof.

It is also possible to carry out the calcination in the absence of any flux, and therefore without premixing the fluxing agent with the precursor, thereby simplifying the method and helping to reduce the content of impurities present in the phosphor. In addition, this thus avoids using products that have to be processed according to strict safety standards on account of their possible toxicity, this being the case for a large number of the abovementioned fluxing agents.

After treatment, the calcined product is advantageously washed so as to obtain a phosphor as pure as possible and in a deagglomerated or slightly agglomerated state. In the latter case, it is possible to deagglomerate the phosphor by subjecting it to a mild deagglomeration treatment.

The aforementioned heat treatments make it possible to obtain phosphors that retain a core/shell structure and a particle size distribution that are very close to those of the particles of the precursor.

Furthermore, the heat treatment may be carried out without inducing substantial diffusion phenomena of the europium from the external phosphor layer into the core.

It should be noted that according to one conceivable variant of the invention, it is possible to carry out the successive calcinations of the two methods described in one and the same step, that is to say to obtain the phosphor directly without stopping at the precursor stage.

Moreover, the invention covers the phosphor that can be obtained by the method of preparation described above.

Because of their properties the phosphors of the invention may be used in lighting or display systems having an excitation source in the UV (200-280 nm) range, for example around 254 nm, notably, in particular, trichromatic mercury vapor lamps and lamps for the backlighting of liquid-crystal systems in tubular or planar form (LCD backlighting). They have a high brightness under UV excitation, and an absence of luminescence loss following a thermal post-treatment. Their luminescence is in particular stable under UV at temperatures ranging between room temperature and 300° C.

The phosphors of the invention are also good candidates as red phosphors for VUV (or "plasma") excitation systems, such as for example for plasma displays and mercury-free trichromatic lamps, especially xenon excitation lamps (whether tubular or planar). The phosphors of the invention have a strong red emission under VUV excitation (for example around 147 nm and 172 nm). The phosphors are stable under VUV excitation.

The phosphors of the invention may also be used as red phosphors in LED (light-emitting diode) excitation devices. They may be especially used in systems that can be excited in the near UV.

They may also be used in UV excitation marking systems.

They may also be dispersed in organic matrices (for example, plastic matrices or polymers transparent under UV, etc.), mineral (for example, silica) matrices or hybrid organic/mineral matrices.

The phosphors of the invention may be used in cathode excitation systems of the CRT (cathode ray tube) or FED (field emission display) or SED (surface emission display) type.

The phosphors of the invention may be used in the manufacture of the devices mentioned above using well-known techniques, for example screen printing, spraying, electrophoresis or sedimentation.

The invention also relates, according to another aspect, to the luminescent devices that comprise, as red luminescence source, the phosphors as described above or the phosphors obtained from the method as also described above.

Examples will now be given.

In the following examples, the particles prepared have been characterized in terms of particle size, morphology and composition using the following methods.

Particle Size Measurements

The particle diameters were determined using a laser particle size analyzer (Malvern 2000) on a sample of particles dispersed in water and subjected to ultrasound (130 W) for 1 minute 30 seconds.

Electron Microscopy

Micrographs were obtained using transmission electron microscopy on a (microtomed) section of the particles using a high-resolution JEOL 2010 FEG TEM microscope. The spatial resolution of the instrument for the chemical composition measurements by EDS (energy dispersion spectroscopy) was <2 nm. By correlating the observed morphologies and the measured chemical compositions, it was possible to demonstrate the core/shell structure and to measure the thickness of the shell on the micrographs.

The chemical composition measurements could also be carried out by EDS on micrographs produced by HAADF-STEM. The measurement corresponded to an average taken over at least two spectra.

X-ray Diffraction

The X-ray diffractograms were produced using the $K_\alpha$ line with copper as anticathode according to the Bragg-Brentano method. The resolution was chosen so as to be sufficient to separate the lines from the various compounds, preferably this resolution was $\Delta(2\theta)<0.02°$.

COMPARATIVE EXAMPLE 1

Oxide of formula $(Y_{0.95}Eu_{0.05})_2O_3$ was prepared in the following manner.

A suspension containing a neutral yttrium europium oxalate (0.095 mol of yttrium per 0.05 mol of europium) was heated to 85° C. A 0.255M ammonium oxalate solution was added to this suspension so as to obtain an oxalate/(Y+Eu) molar ratio of 2 and an ammonium/(Y+Eu) molar ratio of 2. The reaction mixture was maintained with stirring for one hour, the precipitate obtained was recovered by filtration and then washed and dried at 100° C. Finally, it was calcined at 900° C. in air for 2 h. It had a mean diameter measured using Malvern particle size analysis of 6.5 μm.

EXAMPLE 2

This example relates to a core/shell precursor according to the invention, the core of which is a lanthanum phosphate.

Synthesis of the $LaPO_4$ Core

Added over 1 hour to 500 ml of a phosphoric acid ($H_3PO_4$) solution (1.725 mol/l), brought beforehand to pH 1.9 by addition of ammonium hydroxide and heated to 60° C., were 500 ml of a lanthanum nitrate solution (1.5 mol/l). The pH during precipitation was adjusted to 1.9 by addition of ammonium hydroxide.

After the precipitation step, the reaction mixture was again held for 1 h at 60° C. The precipitate was then easily recovered by filtration, washed with water and then dried at 60° C. in air. The powder obtained was then subjected to a heat treatment at 900° C. in air.

The product obtained was densified by being calcined for 2 h in the presence of 1% by weight of LiF, at 1100° C. and in a reducing atmosphere (Ar/$H_2$). A rare-earth phosphate of monazite structure was then obtained. The mean size of the particles, measured as a statistic from 150 particles on microscopic images (SEM), was 3.2 μm.

Synthesis Precursor

A solution A was prepared by mixing 275.5 ml of a 3.45 mol/l yttrium nitrate solution with 24.9 ml of a 2.01 mol/l europium nitrate solution, and then making up the solution to one liter.

Next, 22 g of the core prepared beforehand were dispersed in 650 ml of deionized water, with stirring at 400 rpm, at room temperature. The pH was raised to 8.5 by the addition of 6N ammonium hydroxide. Next, 340 ml of the solution A were added, over 1 hour 30 min, again with stirring and with pH adjustment, to a pH of 8.5, using 6N ammonium hydroxide. After the addition, a 1 hour maturing step was carried out at the same temperature.

The product obtained was then filtered, washed with 2 volumes of water, then dried at 100° C. for 5 h, before being calcined at 900° C. for 2 h.

The core/shell precursor was therefore obtained: X-ray diffraction showed the presence of two separate crystal phases $(Y,Eu)_2O_3$ and $LaPO_4$.

The product had a mean particle size ($D_{50}$) of 8.3 μm.

A TEM micrograph was taken of the resin-coated product prepared by ultramicrotomy (thickness ~100 nm) and placed on a perforated membrane. The particles were seen in section. A section through a particle, the core of which was spherical and surrounded by a shell with an average thickness of 800 nm, was observed in this micrograph.

EXAMPLE 3

This example relates to a phosphor according to the invention.

The precursor product obtained from Example 2 was calcined for 4 h at 1300° C. in air. A phosphor emitting in the red under UV excitation was obtained.

This phosphor had, relative to the phosphor obtained by calcination of the precursor oxide of the comparative example under identical conditions, a photoluminescence yield (PL) of 98%.

This yield was determined by integrating the emission spectrum under 254 nm excitation, measured using a spectrofluorometer, over the 500 nm to 750 nm wavelength range. It was normalized to 100% in respect of the comparative phosphor.

The slight reduction (2%) in PL relative to the comparative phosphor obtained from the precursor of Example 1 and after calcination under conditions identical to those of the present example is quite acceptable, given the 30% europium saving achieved.

EXAMPLE 4

This example relates to a core/shell precursor according to the invention in which the core is an yttrium oxide.

Synthesis of the $Y_2O_3$ Core

An oxide of formula $Y_2O_3$ was prepared using an operating method similar to that described in comparative Example 1. Thus, a suspension containing a neutral yttrium oxalate was heated to 45° C. A 0.255M ammonium oxalate solution was added to this suspension so as to obtain an oxalate/Y molar ratio of 2.5 and an ammonium hydroxide/Y molar ratio of 5. The reaction mixture was kept stirred for 15 min, the precipitate obtained was recovered by filtration, before being washed and dried at 100° C. Finally, it was calcined at 900° C. in air for 2 h. It had a mean diameter measured by Malvern particle size analysis of 4 μm.

The product obtained was then calcined at 1450° C. in the presence of 1% by weight of boric acid. It was then deagglomerated using a ball mill for 2 h, before being washed and dried.

Synthesis Precursor

A solution A was prepared by mixing 275.5 ml of a 3.45 mol/l yttrium nitrate solution with 24.9 ml of a 2.01 mol/l europium nitrate solution, and then making up the solution to one liter.

Next, 21 g of the core prepared beforehand were dispersed in 650 ml of deionized water, with stirring at 400 rpm, at room temperature. The pH was raised to 8.5 by the addition of 6N ammonium hydroxide. Next, 340 ml of the solution A were added, over 1 hour 30 min, again with stirring and with pH adjustment, to a pH of 8.5, using 6N ammonium hydroxide. After the addition, a 1 hour maturing step was carried out at the same temperature.

The product obtained was then filtered, washed with 2 volumes of water, then dried at 100° C. for 5 h, before being calcined at 900° C. for 2 h.

The precursor was therefore obtained: X-ray diffraction showed the presence of two separate crystal phases $(Y,Eu)_2O_3$ and $Y_2O_3$.

The product had a mean particle size $(D_{50})$ of 7.5 μm.

On a TEM micrograph produced as described in Example 2, a section through a particle, the core of which was spherical and surrounded by a shell with an average thickness of 800 nm, was observed.

EXAMPLE 5

This example relates to a phosphor according to the invention.

The precursor product obtained in Example 4 was calcined for 4 h at 1500° C. in air and then deagglomerated so as to obtain a mean size $(D_{50})$ of 7.5 μm. A phosphor emitting in the red under UV excitation was obtained. This phosphor had a PL of 100% and therefore an identical yield to that of the comparative phosphor obtained from the precursor of Example 1 and after calcination under conditions identical to those of the present example, but for a 30% saving in europium.

EXAMPLE 6

This example relates to a core/shell precursor according to the invention in which the core is made of aluminum.

A solution A was prepared by mixing 350 ml of a 2 mol/l yttrium europium nitrate solution (0.665 mol of yttrium and 0.005 mol of europium).

Next, 15.3 g of an alumina powder with a laser particle size $D_{50}$ of 3 μm was dispersed in 650 ml of deionized water, with vigorous stirring, at room temperature. The pH was raised to 8.3 by the addition of 6N ammonium hydroxide. Next, the solution A was added over 1 h 30 min, again with stirring, and with pH adjustment (pH=8.3). After the addition, a 1 h maturing step was carried out at the same temperature.

The product obtained was then filtered, washed with 2 volumes of water, then dried at 100° C. for 5 h, before being calcined at 900° C. for 2 h.

The desired precursor was therefore obtained; X-ray diffraction showed the presence of two separate crystalline phases $(Y,Eu)_2O_3$ and $Al_2O_3$.

The product had a mean particle size $(D_{50})$ of 6.5 μm.

EXAMPLE 7

This example relates to a phosphor according to the invention obtained from the precursor of Example 6.

The precursor of Example 6 was calcined for 4 h at 1550° C. in air. A phosphor emitting in the red under UV excitation was obtained. The photoluminescence yield was measured by integrating the photoluminescence spectrum between 550 nm and 780 nm.

This phosphor had a luminescence yield, relative to the phosphor obtained by calcination under equivalent conditions of the precursor of Example 1, of 100% for a particle size $(D_{50})$ of 7.2 μm.

The invention claimed is:

1. A composition, comprising:
    a mineral core comprising a material selected from the group consisting of lanthanum orthophosphate and gadolinium orthophosphate; and
    a shell based on europium oxide and on yttrium oxide or gadolinium oxide and homogeneously covering the mineral core over a thickness equal to or greater than 300 nm.

2. The composition as claimed in claim 1, wherein the mineral core is comprised of material having a specific surface area of at most 5 $m^2/g$.

3. The composition as claimed in claim 1, wherein the shell further comprises, as a substituent for the gadolinium element, at least one rare earth other than yttrium, europium or gadolinium.

4. The composition as claimed in claim 1, wherein the shell covers the core over a thickness equal to or greater than 2000 nm.

5. The composition as claimed in claim 1, wherein the composition is comprised of particles having a mean diameter of between 1.6 μm and 15 μm.

6. A phosphor, wherein the phosphor comprises a composition as claimed in claim 1.

7. A method of preparing a composition as claimed claim 1, wherein the method comprises the following steps:
    (a) forming a suspension comprising the mineral core, said suspension having a pH of between 8 and 11;
    (b) adding to the suspension a solution comprising a europium salt, a yttrium or gadolinium salt, and optionally a salt of a rare earth other than yttrium, europium or gadolinium, while maintaining the pH of the reaction mixture at a substantially constant value;
    (c) separating a solid formed in the preceding step; and
    (d) calcining the solid thus obtained at a temperature of at most 1000° C.

8. The method as claimed in claim 7, wherein the suspension formed in the first step (a) has a pH of between 8.5 and 9.5.

9. The method as claimed in claim 7, wherein the method further comprises a step of maturing the reaction mixture after step (b).

10. The method as claimed in claim 7, wherein, during step (b) the pH of the reaction mixture is maintained at a constant value of between 8 and 11.

11. The method as claimed in claim 7, wherein, during step (a), the solution comprising the salts is added to the suspension progressively and with stirring.

12. A method of preparing a phosphor, the method comprising calcining a composition as claimed in claim 1 at a temperature of at least 1200° C.

13. The method as claimed in claim 12, wherein the calcination is carried out in the presence of a flux.

14. A luminescent device, wherein the luminescent device comprises, or is manufactured using, a phosphor as claimed in claim 6.

15. The composition as claimed in claim 2, wherein the material has a specific surface area of at most 1 $m^2/g$.

16. The composition as claimed in claim 3, wherein the rare earth is selected from the group consisting of terbium, samarium or lanthanum.

17. The composition as claimed in claim 4, wherein the shell covers the core over a thickness between 750 nm and 1500 nm.

18. The method as claimed in claim 10, wherein the pH of the reaction mixture is maintained at a constant value of between 8.5 and 9.5.

19. A composition, comprising:
    a mineral core comprising a material selected from the group consisting of lanthanum orthophosphate, gadolinium orthophosphate, yttrium oxide, gadolinium oxide, zirconium oxide and alumina; and a shell based on europium oxide and gadolinium oxide and homogeneously covering the mineral core over a thickness equal to or greater than 300 nm.

20. A method of preparing a composition as claimed claim 19, wherein the method comprises the following steps:
(a) forming a suspension comprising the mineral core, said suspension having a pH of between 8 and 11;
(b) adding to the suspension a solution comprising a europium salt, a gadolinium salt, and optionally a salt of a rare earth other than yttrium, europium or gadolinium, while maintaining the pH of the reaction mixture at a substantially constant value;
(c) separating a solid formed in the preceding step; and
(d) calcining the solid thus obtained at a temperature of at most 1000° C.

\* \* \* \* \*